(12) United States Patent
Scarsdale

(10) Patent No.: US 6,307,290 B1
(45) Date of Patent: Oct. 23, 2001

(54) PISTON MOTOR PROTECTOR, AND MOTOR AND PUMPING SYSTEM INCORPORATING THE SAME

(75) Inventor: Kevin T. Scarsdale, Bartlesville, OK (US)

(73) Assignee: Camco International, Inc., Houston, TX (US)

(*) Notice: Subject to any disclaimer, the term of this patent is extended or adjusted under 35 U.S.C. 154(b) by 0 days.

(21) Appl. No.: 09/268,372

(22) Filed: Mar. 15, 1999

Related U.S. Application Data

(60) Provisional application No. 60/078,160, filed on Mar. 16, 1998.

(51) Int. Cl.[7] .............................. H02K 5/132; F04D 13/08
(52) U.S. Cl. ......................... 310/87; 417/423.3; 417/414
(58) Field of Search ...................... 310/87, 85; 166/68.5; 417/414, 423.3

(56) References Cited

U.S. PATENT DOCUMENTS

| | | | |
|---|---|---|---|
| 2,218,937 | * 10/1940 | Myers | 310/87 |
| 4,487,299 | 12/1984 | Bookout | 188/313 |
| 5,367,214 | * 11/1994 | Turner | 310/87 |

FOREIGN PATENT DOCUMENTS

| | | | |
|---|---|---|---|
| 2 085 667 A | 4/1982 | (GB) | H02K/5/132 |
| 2 089 446 A | 6/1982 | (GB) | F16J/15/16 |
| 01152940 A | 6/1989 | (JP) | H02K/5/132 |
| 10094210 | 4/1998 | (JP) | H02K/5/12 |

* cited by examiner

Primary Examiner—Burton S. Mullins
(74) Attorney, Agent, or Firm—Fletcher, Yoder & Van Someran

(57) ABSTRACT

A downhole pumping system includes a downhole pump that is coupled to a downhole motor. The downhole motor includes a motor protector that utilizes one or more retractable and extensible pistons, instead of an elastomeric bag, to accommodate motor oil contraction and expansion. The motor protector may also include one or more contamination containment sections for processing contaminants in downhole fluid to reduce contamination of the motor oil.

48 Claims, 5 Drawing Sheets

PISTON MOTOR PROTECTOR, AND MOTOR AND PUMPING SYSTEM INCORPORATING THE SAME

CROSS-REFERENCE TO RELATED APPLICATIONS

This application is a nonprovisional application of provisional application serial No. 60/078,160, filed on Mar. 16, 1998.

BACKGROUND OF THE INVENTION

1. Field of the Invention

The present invention relates generally to downhole pumping systems and, more particularly to a motor protector for use with a downhole pumping system.

2. Description of the Related Art

Electric submergible pumps are widely used throughout the world for recovering subterranean fluids to the earth's surface. For the long term successful operation of such submergible pumping systems, the electric motor is supplied with uncontaminated motor oil. The motor oil not only lubricates the motor, it also cools the motor to prevent overheating.

In most submergible pumping systems in use today, this motor oil is partially contained within a device commonly referred to as a motor protector. Conventional motor protectors typically include one or more elastomeric bags. These elastomeric bags provide two important functions: (1) equalizing the fluid pressure within the motor and (2) preventing well fluids and gases from contaminating the motor oil.

In regard to the first function, it should be understood that the temperature of the motor oil varies as a result of the intermittent operation of the submergible motor. As the temperature of the motor oil rises, for instance, the oil tends to expand and the pressure within the motor tends to increase. If the motor protector did not include an expandable member, such as the elastomeric motor protector bag, the internal pressure of the motor would increase dramatically. However, the motor protector bag expands and contracts to compensate for the varying liquid volume and to maintain a relatively constant pressure within the motor.

In regard to the second function, the motor protector bag provides a degree of isolation between the motor oil and the well fluids and gases. This isolation helps keep the motor oil clean to increase the longevity of the motor. Most elastomeric motor protector bags prevent many contaminants, such as crude oil, water, brine, and dirt, which may greatly reduce the life of the motor, from entering the motor.

As discussed above, in many applications elastomeric motor protector bags perform reasonably well. However, elastomeric bags suffer from several limitations. First, the repeated expanding and contraction of the elastomeric bag can cause the bag to split or crack under certain conditions. Of course, once an elastomeric bag splits or cracks it no longer protects the motor oil from contaminants which are then free to enter and ultimately damage the motor. Second, elastomeric bags tend to lose their elasticity due to various conditions which may be present in a wellbore. Once an elastomeric bag loses its elasticity, it can no longer expand and contract as needed to satisfy the requirements of the motor oil which it contains. Eventually the bag will rupture, leaving the contaminants free to attack the motor. Third, most elastomers cannot survive in environments where the temperature rises above about 400° F. Above that temperature, most elastomers become brittle causing the bag to break during expansion or contraction. Finally, elastomeric compounds currently used for motor protector bags tend to be relatively permeable as compared to the contaminants within the wellbore fluid. Many wells contain contaminants, such as hydrogen sulfide for instance, which will permeate the motor protector bag and attack the motor. In fact, certain contaminants, such as hydrogen sulfide, also tend to alter the chemistry of certain elastomers, causing the elastomers to harden. Once the elastomer has hardened, the bag eventually breaks.

In an effort combat to one or more these problems, the elastomeric material used to fabricate the motor protector bags have been studied and chosen to provide certain advantages. For instance, certain elastomers may slow the rate at which contaminants such as hydrogen sulfide enter the motor, but they cannot stop the permeation completely. Alternatively, certain elastomers may exhibit an ability to withstand temperatures as high as about 400° F., but these elastomers tend to have limited elasticity incompatible with the requirements of the motor.

The present invention may address one or more of the problems discussed above.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
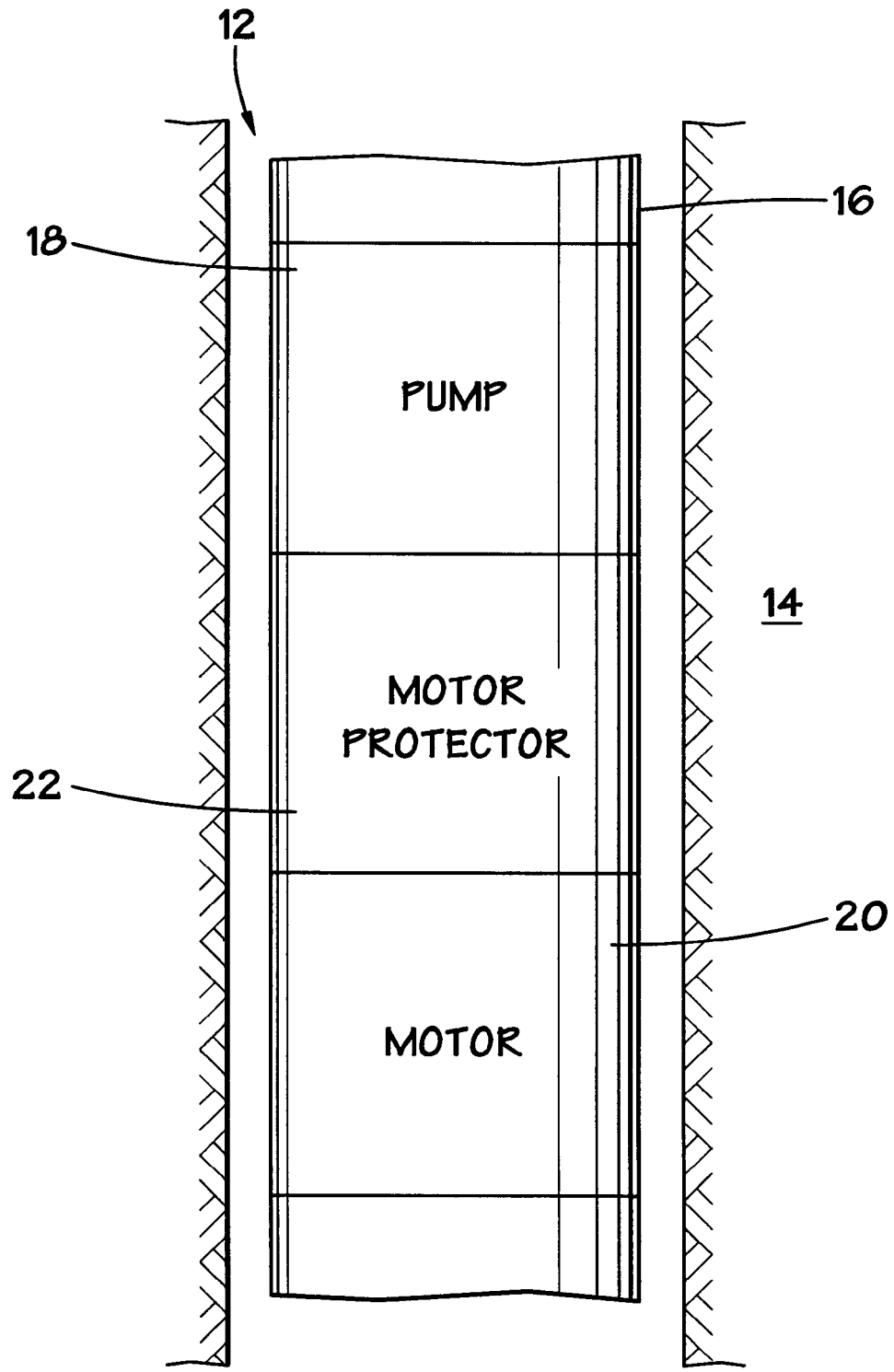
FIG. 1 illustrates a submergible pumping system in accordance with the present invention.

Turning now to the drawings and referring initially to FIG. 1, a pumping system is illustrated and generally designated by a reference numeral 10. The pumping system 10 is shown located in a well bore 12 that has been created within a subterranean formation 14. Although not specifically illustrated, it is well known that the well bore 12 contains fluids and gases from the surrounding formation 14 and that the pumping system 10 is adapted to be submerged in these fluids and gases within the well bore 12.

The pumping system 10 is typically part of a production tubing string 16 and is responsible for pumping fluids and/or gases from the well bore 12 to the surface of the Earth. The pumping system 10 includes a pump 18 that is driven by a motor 20. The motor 20 is advantageously an electric motor. The motor 20 contains motor oil (not shown) which lubricates and cools the motor 20. A motor protector 22 is coupled to the motor 20. The motor protector 22 contains a portion of the motor oil, and it functions to keep the motor oil free from contaminants and to maintain a relatively constant pressure within the motor 20. Although the motor protector 22 is illustrated in this example as being coupled between the pump 18 and the motor 20, it should be understood that other arrangements may be suitable.

Figure 2:
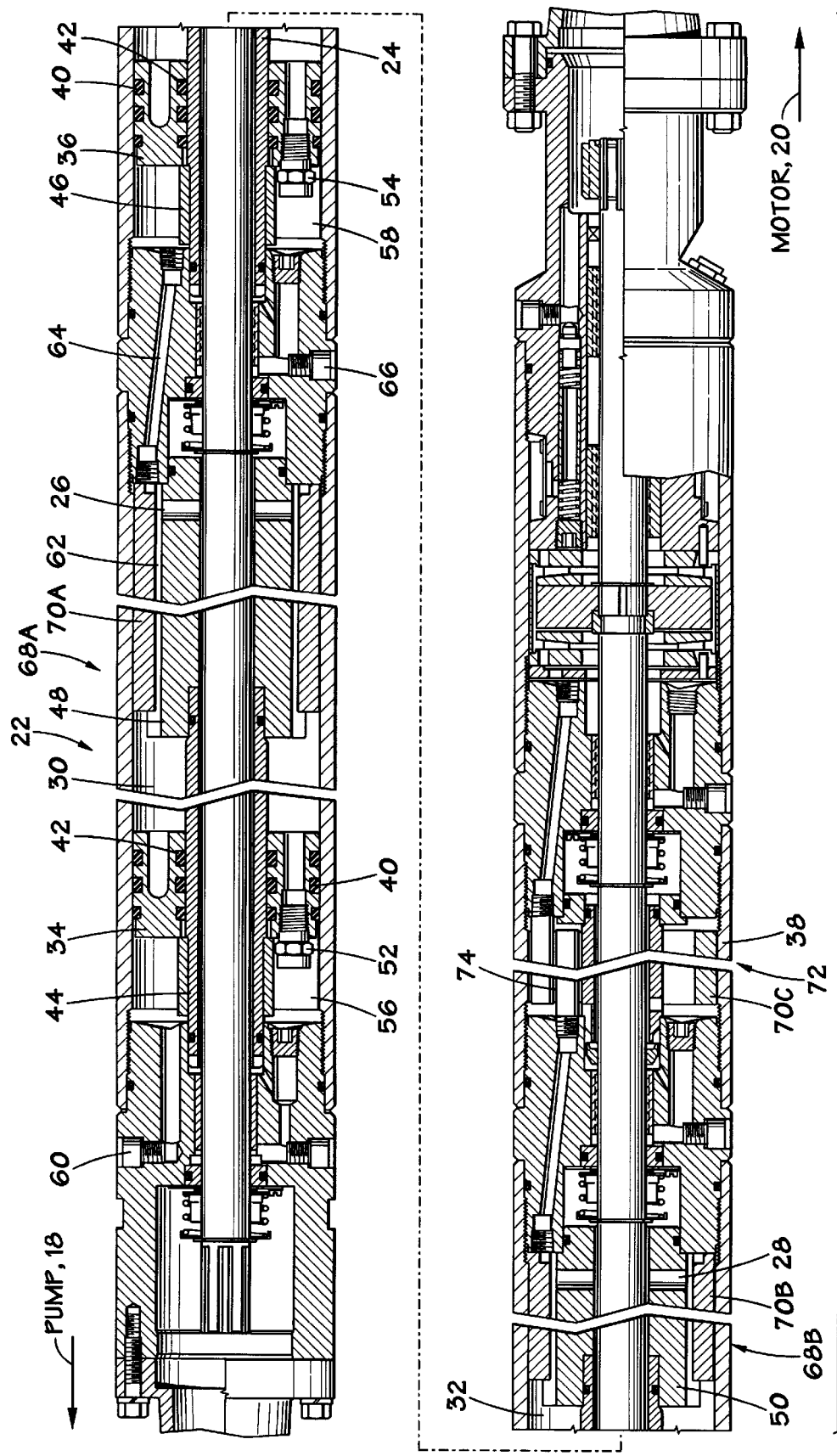
FIG. 2 illustrates a motor protector in accordance with the present invention.

A detailed cross-sectional view of one embodiment of the motor protector 22 is depicted in FIG. 2. A drive shaft 24 runs through the center of the motor protector 22 and couples the motor 20 to the pump 18. Advantageously, the drive shaft 24 may be hollow to carry motor oil from the motor 20 into the motor protector 22. One or more ports 26 and 28 extend through the drive shaft 24 at selected locations to provide a fluidic communication path between the interior of the drive shaft 24 and respective expansion/contraction chambers 30 and 32. Each chamber 30 and 32 is defined by a respective expandable member.

In conventional motor protectors, the expandable members that define expansion/contraction chambers are usually elastomeric motor protector bags. However, due to the various shortcomings described above, in this embodiment the elastomeric motor protector bags have been replaced with one or more pistons. In this particular example, two pistons 34 and 36 which define the respective chambers 30 and 32 are illustrated. A two-piston motor protector has been chosen to demonstrate various advantages, but it should be understood that either a single piston or three or more pistons could also be used in the motor protector 22. Like the elastomeric motor protector bags, the pistons 34 and 36 offer the advantages of expansion and contraction in response to thermal expansion and contraction of the motor oil. Thus, the motor 20 need not be constructed to withstand extraordinarily high pressures that would be present in a system that did not provide any pressure equalization device, such as an expandable member.

However, the piston arrangement offers additional advantages as well. First, the pistons 34 and 36 are advantageously fabricated from metal that is suitable for the environment in which the pumping system 10 is to be placed. In continuing with the example of a well bore environment that contains hydrogen sulfide, the pistons 34 and 36 may be fabricated from alloy 625, for example. Such stainless steel is not only resistant to the corrosive effects of the well bore fluids and gases, it is also impermeable to hydrogen sulfide, as well as most other fluids and gases found in typical well bore environments.

Second, because hydrogen sulfide cannot enter the motor oil through the metal pistons 34 and 36, scavengers need not be added to the motor oil. The lack of scavengers is advantageous for various reasons. For instance, motor oil additives, like scavengers, tend to increase the cost of the motor oil. Also, such additives typically reduce the effectiveness of the motor oil in performing its primary functions of cooling and lubricating the motor. Finally, it has been found that many such scavengers reduce the dielectric constant of the motor oil. In the event that insulation that protects windings and other conductors within the motor fails, a motor oil having a high dielectric constant is advantageous because it will reduce the likelihood of arcing between exposed conductors that may damage the motor.

Third, the metal pistons 34 and 36 can withstand greatly elevated temperatures as compared with elastomeric motor protector bags. While a typical elastomeric motor protector bag may be able to operate relatively effectively in an environment where temperatures reach 300° F. to 400° F., the metal pistons 34 and 36 can operate effectively in an environment where temperatures exceed 600° F.

Figure 3:
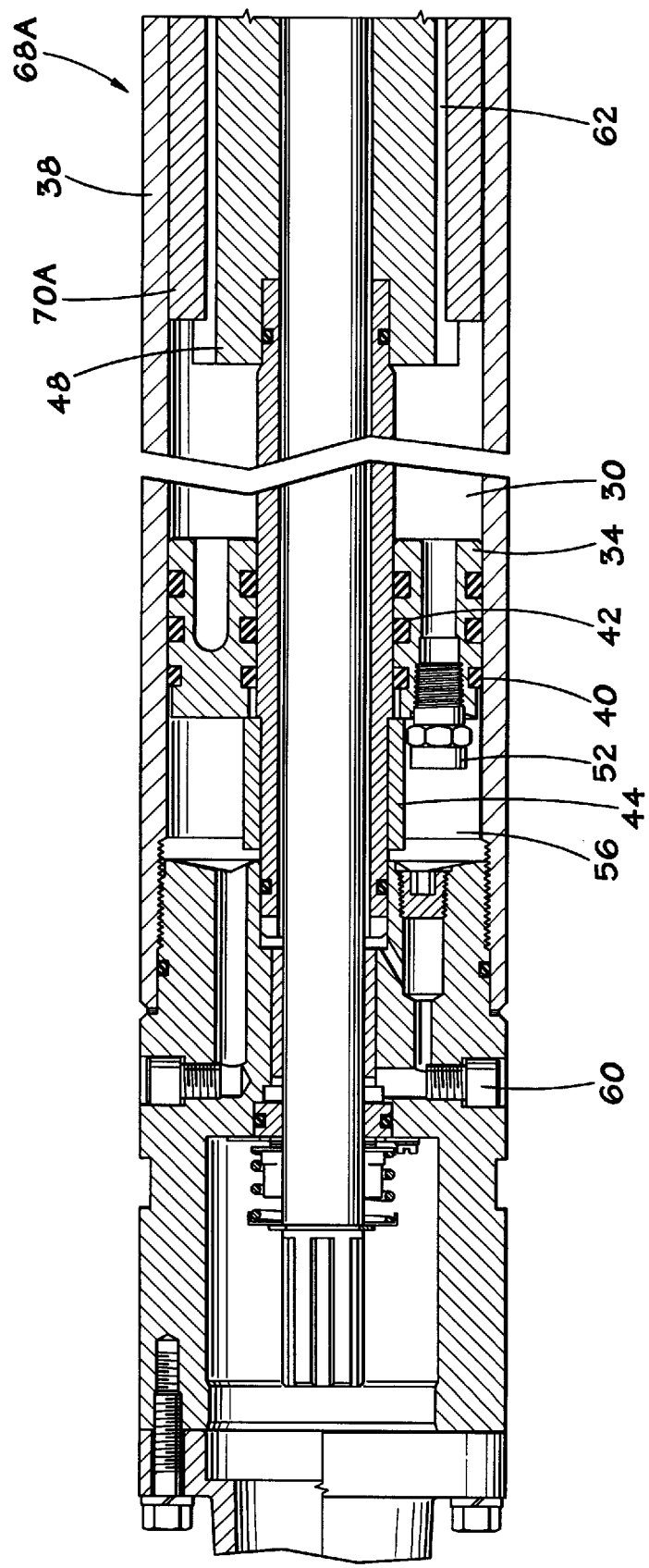
FIG. 3 illustrates a detailed view of a first piston of the motor protector of FIG. 2.
Figure 4:
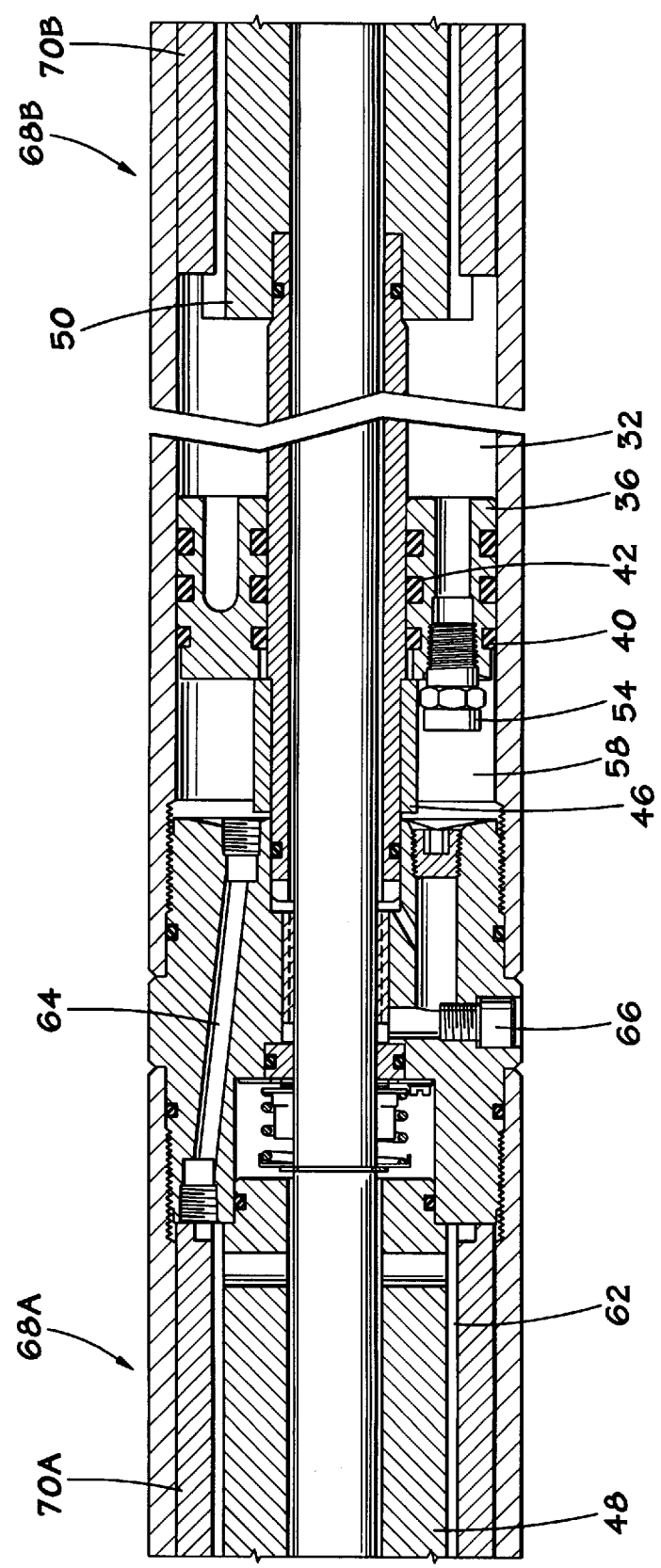
FIG. 4 illustrates a detailed view of a second piston of the motor protector of FIG. 2.

Unlike an elastomeric motor protector bag that expands and contracts in a generally radial direction, the pistons 34 and 36 move in an axial direction in response to the thermal expansion and contraction of the motor oil within the chambers 30 and 32. Specifically, each piston 34 and 36 is annularly-shaped so that it may travel within the annulus defined between the inner surface of the casing 38 of the motor protector 22 and the outer surface of the drive shaft 24. As illustrated in FIGS. 2 through 4, although metal, ceramic, or mechanical seals may be used, each piston 34 and 36 is advantageously sealed against the inner surface of the casing 38 by one or more O-rings 40, and each piston 34 and 36 is advantageously sealed against the outer surface of the drive shaft 24 by one or more O-rings 42. The Wrings 40 and 42 may be made of any material that is suitable for the environment in which the pumping system 10 is to be placed. For example, in the continuing example of an environment that contains hydrogen sulfide, it may be advantageous to select O-rings made from KALREZ™, available from Dupont, which is an elastomer that demonstrates very little permeability to hydrogen sulfide.

The length of the annular chambers 30 and 32 and the range of movement of the pistons 34 and 36 within these chambers are primarily dependent upon the amount of expansion and contraction desired for the particular motor application. In the illustrated example, the outer diameter of the casing 38 may be about 4.0 inches. The outer diameter of each piston 34 and 36 may be about 3.5 inches, which is slightly less than the inner diameter of the casing 38. The length of each chamber 30 and 32 may be about 24.0 inches, and the range of motion of the pistons 34 and 36 within each chamber may be up to about 20.0 inches. Of course, it should be understood that the chambers 30 and 32 may be made longer or shorter in order to suit a particular application.

In this embodiment, each chamber 30 and 32 is in direct fluidic communication with the interior of the drive shaft 24 by virtue of the respective ports 26 and 28. Thus, the pistons 34 and 36 tend to extend and retract simultaneously in response to thermal expansion and contraction of the motor oil. The extension of each piston 34 and 36 is limited by a respective stop cylinder 44 and 46, while the retraction of each piston 34 and 36 is limited by a respective stop member 48 and 50.

Each piston 34 and 36 is illustrated in its fully extended position as being seated against its respective stop cylinder 44 and 46. In the event that the motor oil heats to a degree which causes such fall extension, it may be advantageous to provide a relief valve 52 and 54 in each respective piston 34 and 36. The relief valves 52 and 54 are intended to bleed off excess oil once the pressure within the motor 20 reaches a given point, while, advantageously, still maintaining the pressure within the motor 20 and the motor protector 22 at a higher pressure than the surrounding well bore 12.

In operation, a port 60 allows fluid from the well bore 12 to enter the outer chamber 56 to counteract the pressure exerted by the motor oil within the chamber 30. The chamber 30 is fluidically coupled to the outer chamber 58 via the ports 62 and 64. Although a port 66 may allow fluid from the well bore 12 into the outer chamber 58, the port 66 is typically plugged during submerged operation of the pumping system 10. Given the fact that the outer chamber 58 is typically isolated from the well bore 12 during operation, in conjunction with the fact that each chamber 30 and 32 is coupled directly to the motor oil within the drive shaft 24, the relief valve 54 may be omitted, as the relief valve 52 may be relied on alone to relieve oil pressure.

To reduce the chances of contamination reaching the motor 20 further, a contamination containment or elimination section 68 may be provided adjacent one or both piston chambers 30 and 32. In this particular example, two sections 68A and 68B are illustrated, with each section 68A and 68B being placed on the motor side of each respective chamber 30 and 32. In continuing with the example of an environment containing hydrogen sulfide, the sections 68A and 68B may contain zinc members 70A and 70B, although the type of containment or elimination section 68 may vary depending upon the type of contaminant that is to be contained or eliminated. As discussed above, the port 62 passes through the first section 68A to deliver motor oil to the chamber 58. The radially outer surface of the port 62 is defined by the zinc member 70A which reacts with any hydrogen sulfide to produce relatively harmless zinc sulfide. Thus, as long as the zinc member 70A remains, hydrogen sulfide will not reach the chamber 58.

Although a motor protector having only a single piston chamber and a single contamination containment or elimination section offers clear advantages, a motor protector 22 having two piston chambers 30 and 32, as illustrated, is particularly advantageous. As discussed above, much of the contamination that may enter past the O-ring seals 40 and 42 of the first piston 34 may be contained or eliminated before reaching the second piston 36. Similarly, with the presence of the second section 68B, with its similar ports and the zinc member 70B, much of the contamination that may enter past the O-ring seals 40 and 42 of the second piston 36 may be contained or eliminated before reaching the motor 20.

Figure 5:
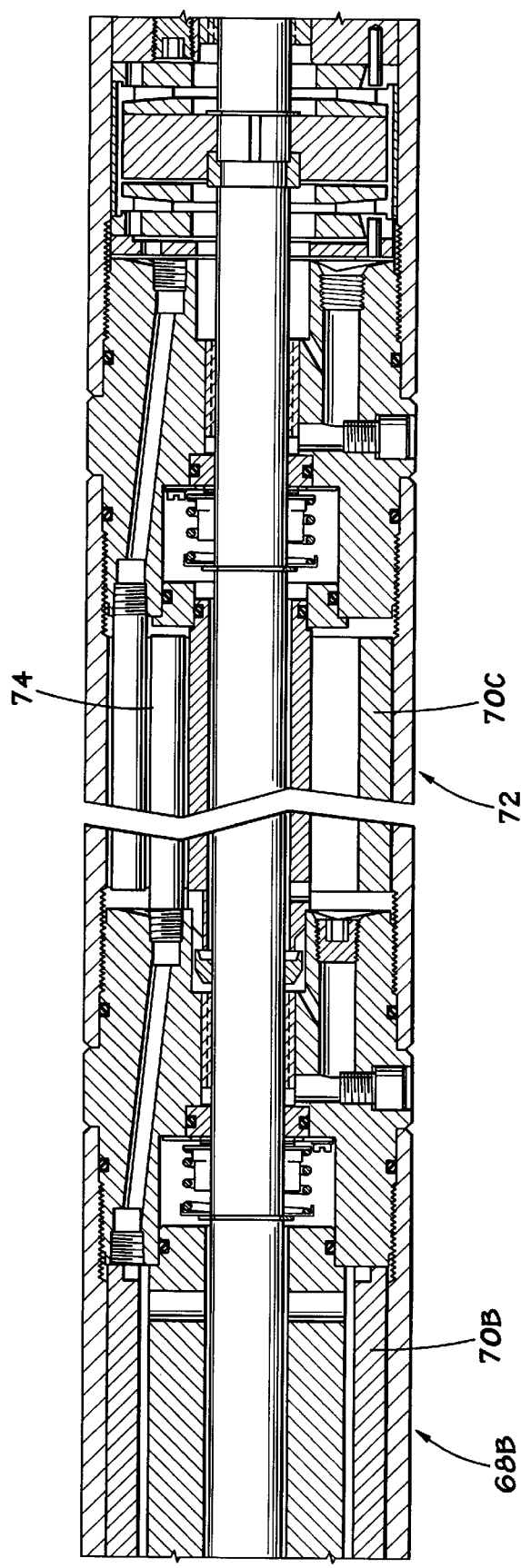
FIG. 5 illustrates a detailed view of a labyrinth seal of the motor protector of FIG. 2.

Referring additionally to FIG. 5, to provide even greater protection against contamination, a labyrinth section 72 containing a labyrinth seal 74 may be provided between the second section 68B and the motor 20. Because the labyrinth seal 74 does provide some protection against contaminants, the seal 74 acts as the last line of defense of the motor protector 22 for preventing contaminants from reaching the motor oil that passes into the motor 20. In fact, a zinc member 70C may also be incorporated into the labyrinth section 72 to enhance the contamination containment and elimination properties of the section 72 even further.

While the invention may be susceptible to various modifications and alternative forms, specific embodiments have been shown by way of example in the drawings and have been be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A motor protector comprising:
   a casing adapted to be operatively coupled to a downhole motor;
   a first chamber defined within the casing, the first chamber having a first fluid port adapted to couple the first chamber to fluid within the downhole motor;
   a first piston disposed in the first chamber, the first piston having a first side and a second side, the first side of the first piston being adapted to contact the fluid, the first piston being axially slidable within the first chamber in response to pressure of the fluid on the first side of the first piston; and
   a bi-directional fluidic seal disposed between the first piston and the first chamber.

2. The motor protector, as set forth in claim 1, wherein the first piston is fabricated of metal.

3. The motor protector, as set forth in claim 2, wherein the metal comprises stainless steel.

4. The motor protector, as set forth in claim 1, wherein the fluidic seal comprises an O-ring disposed about the first piston.

5. The motor protector, as set forth in claim 1, wherein the motor protector is comprised of materials that enable the motor protector to operate at temperatures above 600° F.

6. The motor protector, as set forth in claim 1, wherein the first chamber comprises an annular chamber and wherein the first piston comprises an annular piston.

7. The motor protector, as set forth in claim 1, comprising a first extension stop disposed at a first end of the first chamber and a first retraction stop disposed at a second end of the first chamber, the first extension stop being contactable by the first piston to limit slidable movement of the first piston within the first chamber in a first direction, and the first retraction stop being contactable by the first piston to limit slidable movement of the first piston within the first chamber in a second direction.

8. The motor protector, as set forth in claim 1, comprising a relief valve coupled to the first chamber, the relief valve expelling the fluid from the first chamber in response to the pressure of the fluid exceeding a given pressure.

9. The motor protector, as set forth in claim 1, comprising a contamination containment section disposed within the casing adjacent the first chamber, the contamination containment section being adapted to process downhole fluid to reduce contamination of the fluid within the downhole motor.

10. The motor protector, as set forth in claim 9, wherein the contamination section comprises a first member disposed therein to chemically react with the contaminant in downhole fluid.

11. The motor protector, as set forth in claim 10, wherein the first member comprises zinc.

12. The motor protector, as set forth in claim 9, comprising a labyrinth seal disposed in the casing between the contamination section and the downhole motor.

13. The motor protector, as set forth in claim 12, wherein the labyrinth seal comprises a second member disposed therein to chemically react with the contaminant in downhole fluid.

14. The motor protector, as set forth in claim 13, wherein the second member comprises zinc.

15. The motor protector, as set forth in claim 1, comprising:
   a second chamber defined within the casing, the second chamber having a second fluid port adapted to couple the second chamber to the fluid;
   a second piston disposed in the second chamber, the second piston having a first side and a second side, the first side of the second piston being adapted to contact the fluid, the second piston being axially slidable within the second chamber in response to pressure of the fluid on the first side of the second piston.

16. The motor protector, as set forth in claim 15, wherein the second fluid port fluidically couples the first chamber to the second chamber.

17. A motor protector comprising:
   a casing adapted to be operatively coupled to a downhole motor;
   a first chamber defined within the casing, the first chamber having a first fluid port adapted to couple the first chamber to fluid within the downhole motor;
   a first piston disposed in the first chamber, the first piston having a first side and a second side, the first side of the first piston being adapted to contact the fluid, the first piston being axially slidable within the first chamber in response to pressure of the fluid on the first side of the first piston;
   a second chamber defined within the casing, the second chamber having a second fluid port adapted to couple the second chamber to the fluid; and a second piston disposed in the second chamber, the second piston having a first side and a second side, the first side of the second piston being adapted to contact the fluid, the second piston being axially slidable within the second chamber in response to pressure of the fluid on the first side of the second piston.

18. The motor protector, as set forth in claim 17, wherein the first piston and the second piston are fabricated of metal.

19. The motor protector, as set forth in claim 18, wherein the metal comprises stainless steel.

20. The motor protector, as set forth in claim 17, wherein a first fluidic seal is disposed between the first piston and the first chamber, and wherein a second fluidic seal is disposed between the second piston and the second chamber.

21. The motor protector, as set forth in claim 20, wherein the first fluidic seal comprises a first O-ring disposed about the first piston, and wherein the second fluidic seal comprises a second O-ring disposed about the second piston.

22. The motor protector, as set forth in claim 17, wherein the motor protector is comprised of materials that enable the motor protector to operate at temperatures above 600° F.

23. The motor protector, as set forth in claim 17, wherein the firs chamber comprises a first annular chamber and wherein the first piston comprises a first annular piston, and wherein the second chamber comprises a second annular chamber and wherein the second piston comprises a second annular piston.

24. The motor protector, as set forth in claim 17, comprising a first extension stop disposed at a first end of the first chamber and a first retraction stop disposed at a second end of the first chamber, the first extension stop being contactable by the first piston to limit slidable movement of the first piston within the first chamber in a first direction, and the first retraction stop being contactable by the first piston to limit sidable movement of the first piston within the first chamber in a second direction, and comprising a second extension stop disposed at a first end of the second chamber and a second retraction stop disposed at a second end of the second chamber, the second extension stop being contactable by the second piston to limit slidable movement of the second piston within the second chamber in the first direction, and the second retraction stop being contactable by the second piston to limit slidable movement of the second piston within the second chamber in the second direction.

25. The motor protector, as set forth in claim 17, comprising a first relief valve coupled to the first chamber, the first relief valve expelling the fluid from the first chamber in response to the pressure of the fluid exceeding a first given pressure, and comprising a second relief valve coupled to the second chamber, the second relief valve expelling the fluid from the second chamber in response to the pressure of the fluid exceeding a second given pressure.

26. The motor protector, as set forth in claim 17, comprising a first contamination containment section disposed within the casing adjacent the first chamber and a second contamination containment section disposed within the casing adjacent the second chamber, the first and second contamination containment sections being adapted to process downhole fluid to reduce contamination of the fluid within the downhole motor.

27. The motor protector, as set forth in claim 26, wherein the first contamination section comprises a first member disposed therein to chemically react with a first contaminant in downhole fluid, and wherein the second contamination section comprises a second member disposed therein to chemically react with a second contaminant in downhole fluid.

28. The motor protector, as set forth in claim 27, wherein the first member and the second member comprise zinc.

29. The motor protector, as set forth in claim 26, comprising a labyrinth seal disposed in the casing between the second contamination section and the downhole motor.

30. The motor protector, as set forth in claim 29, wherein the labyrinth seal comprises a third member disposed therein to chemically react with a third contaminant in downhole fluid.

31. The motor protector, as set forth in claim 30, wherein the third member comprises zinc.

32. The motor protector, as set forth in claim 17, wherein the second fluid port fluidically couples the first chamber to the second chamber.

33. A downhole pumping system comprising:
a downhole pump;
a downhole motor being operatively coupled to the downhole pump;
a motor protector being operatively coupled to the downhole motor, the motor protector comprising:
a casing operatively coupled to the downhole motor;
a first chamber defined within the casing, the first chamber having a first fluid port adapted to couple the first chamber to fluid within the downhole motor;
a first piston disposed in the first chamber, the first piston having a first side and a second side, the first side of the first piston being adapted to contact the fluid, the first piston being axially slidable within the first chamber in response to pressure of the fluid on the first side of the first piston; and
a contamination containment section disposed within the casing adjacent the first chamber, the contamination containment section being adapted to process downhole fluid to reduce contamination of the fluid within the downhole motor.

34. The system, as set forth in claim 33, wherein the first piston is fabricated of metal.

35. The system, as set forth in claim 34, wherein the metal comprises stainless steel.

36. The system, as set forth in claim 33, wherein a fluidic seal is disposed between the first piston and the first chamber.

37. The system, as set forth in claim 36, wherein the fluidic seal comprises an O-ring disposed about the first piston.

38. The system, as set forth in claim 33, wherein the motor protector is comprised of materials that enable the motor protector to operate at temperatures above 600° F.

39. The system, as set forth in claim 33, wherein the first chamber comprises an annular chamber and wherein the first piston comprises an annular piston.

40. The system, as set forth in claim 33, comprising a first extension stop disposed at a first end of the first chamber and a first retraction stop disposed at a second end of the first chamber, the first extension stop being contactable by the first piston to limit slidable movement of the first piston within the first chamber in a first direction, and the first retraction stop being contactable by the first piston to limit slidable movement of the first piston within the first chamber in a second direction.

41. The system, as set forth in claim 33, comprising a relief valve coupled to the first chamber, the relief valve expelling the fluid from the first chamber in response to the pressure of the fluid exceeding a given pressure.

42. The system, as set forth in claim 33, wherein the contamination section comprises a first member disposed therein to chemically react with the contaminant in downhole fluid.

43. The system, as set forth in claim 42, wherein the first member comprises zinc.

44. The system, as set forth in claim 33, comprising a labyrinth seal disposed in the casing between the contamination section and the downhole motor.

45. The system, as set forth in claim 44, wherein the labyrinth seal comprises a second member disposed therein to chemically react with the contaminant in downhole fluid.

46. The system, as set forth in claim 45, wherein the second member comprises zinc.

47. The system,4 as set forth in claim 33, comprising:

a second chamber defined within the casing, the second chamber having a second fluid port adapted to couple the second chamber to the fluid;

a second piston disposed in the second chamber, the second piston having a first side and a second side, the first side of the second piston being adapted to contact the fluid, the second piston being axially slidable within the second chamber in response to pressure of the fluid on the first side of the second piston.

48. The system, as set forth in claim 47, wherein the second fluid port fluidically couples the first chamber to the second chamber.

* * * * *